Feb. 10, 1953 A. SIMMON 2,627,786
ADJUSTABLE LIQUID COLOR FILTER FOR PHOTOGRAPHIC ENLARGERS
Filed July 20, 1948 3 Sheets-Sheet 2
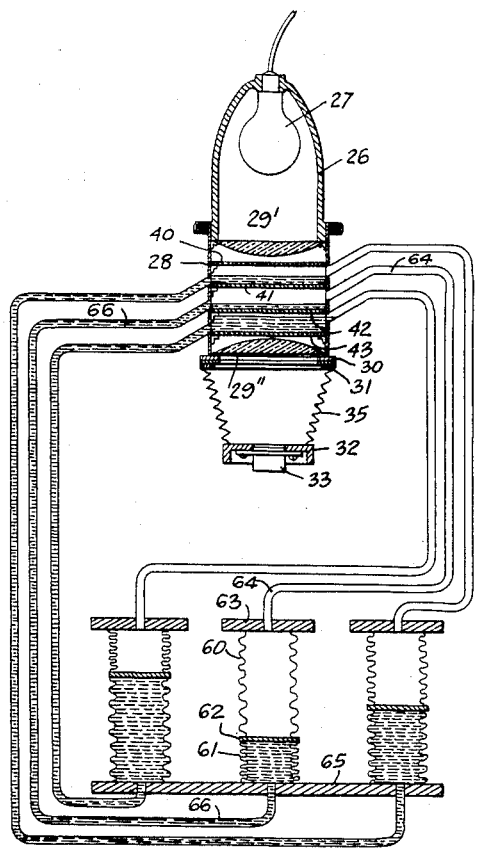
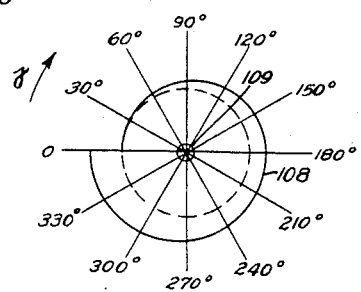
INVENTOR:
Alfred Simmon
BY
ATTORNEY.

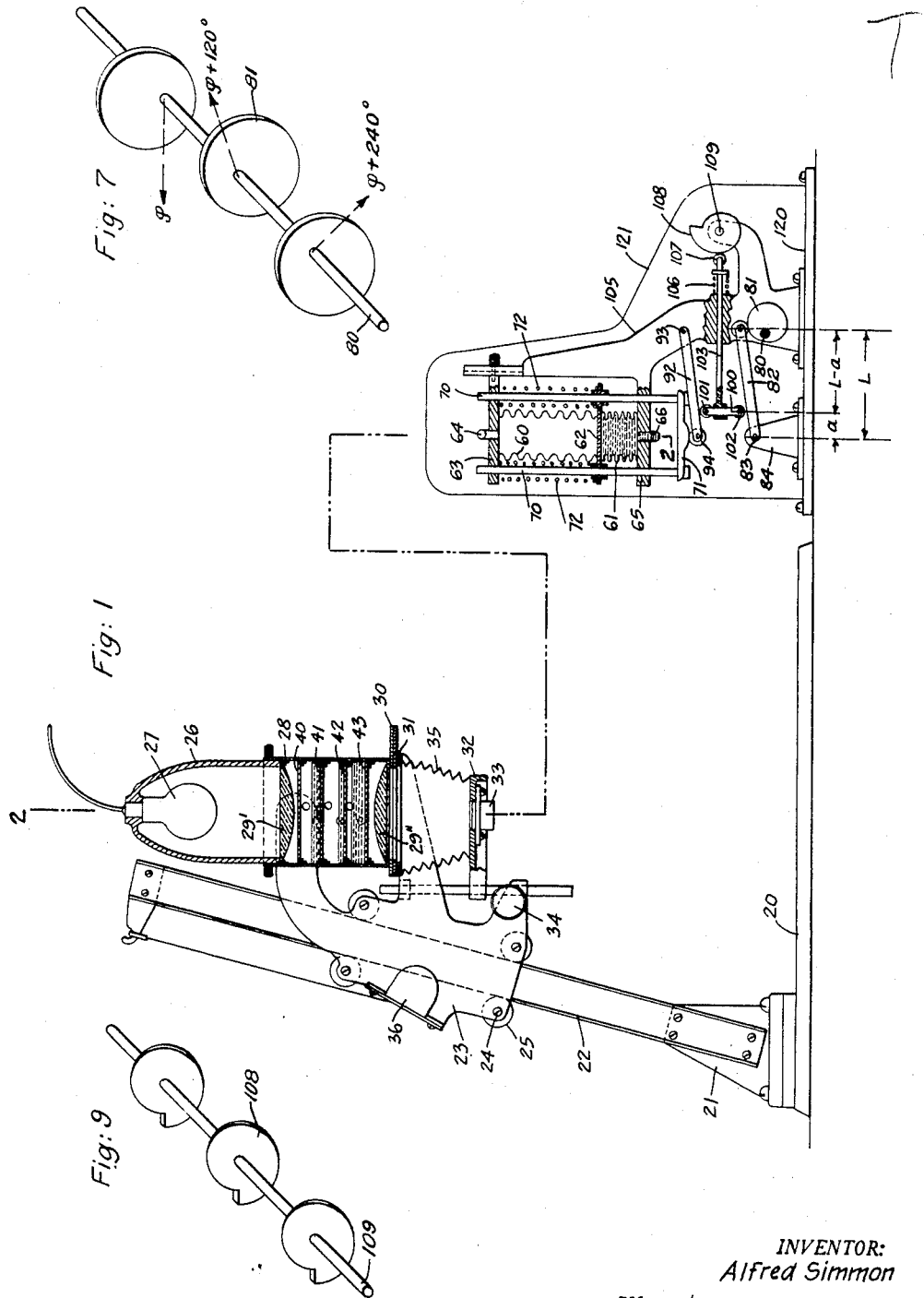

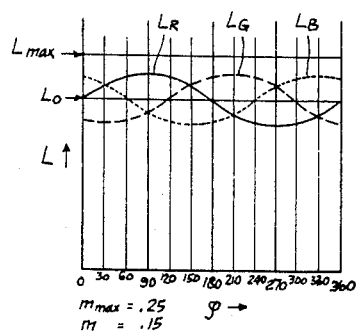
Fig: 3
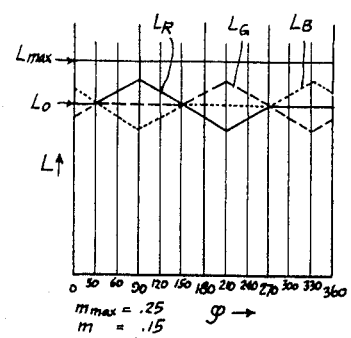
Fig: 4
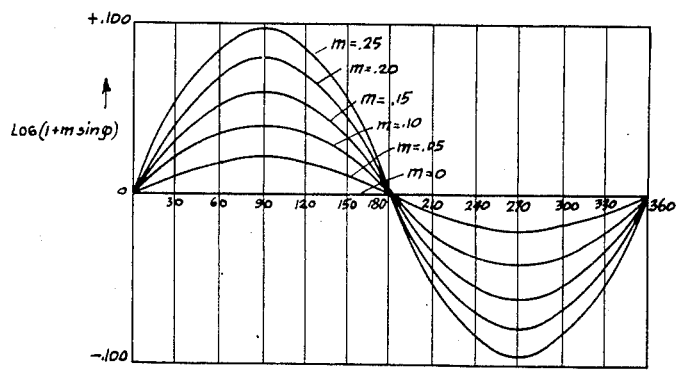
Fig: 5
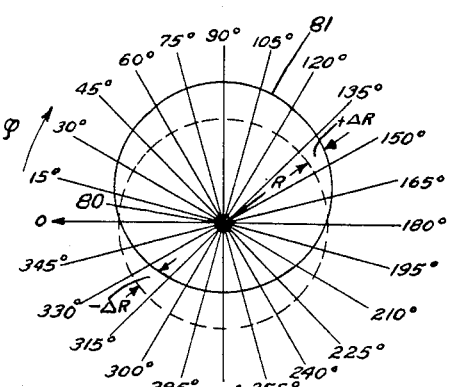
Fig: 6
INVENTOR:
Alfred Simmon
BY Walter E. Wollheim
ATTORNEY.

Patented Feb. 10, 1953

2,627,786

UNITED STATES PATENT OFFICE

2,627,786

ADJUSTABLE LIQUID COLOR FILTER FOR PHOTOGRAPHIC ENLARGERS

Alfred Simmon, Jackson Heights, N. Y., assignor to Simmon Brothers, Inc., Long Island City, N. Y., a corporation of New York Application July 20, 1948, Serial No. 39,744

5 Claims. (Cl. 88—107)

The purpose of this invention is to provide an adjustable color filter for photographic enlargers. More particularly, this invention comprises a cell with transparent top and bottom walls which contains a layer of a colored liquid including means to adjust the height of said layer.

A modification of this invention contemplates the use of such a cell filled with two liquids which are of different specific gravity, of different colors and unmixable with each other, including means to change the relative heights of the two layers, thereby providing stepless means to change the filter color from one color to the other through all intermediate shades.

Another modification uses three cells interposed in the light beam of the enlarger, each cell containing an adjustable layer of a differently colored liquid, the respective layers being preferably complementary to the three primary colors. This last named modification is preferably associated with a mechanical adjusting device which has separate means for adjusting the direction and magnitude, respectively, of the color correction introduced by this triple filter.

A preferred embodiment of my invention is shown in the appended drawings in which Fig. 1 shows a longitudinal sectional view of a typical photographic enlarger equipped with a filter built according to the principles of this invention, together with a cross-sectional view through the associated mechanical adjusting device, some of its details shown diagrammatically only;

Fig. 2 is a cross-sectional view along the plane of line 2—2 in Fig. 1;

Figs. 3, 4 and 5 are graphical representations by means of which the mathematical foundation for the design of the adjusting mechanism will be explained;

Figs. 6 and 8 show cams which form part of said adjusting mechanism, and

Figs. 7 and 9 show cam shafts carrying sets of three cams built according to Fig. 6 or 8, respectively.

Like characters of reference denote similar parts throughout the several views and the following specification.

Enlarger

The enlarger shown in Fig. 1 is merely a representative example in which the color filter can be incorporated. The detailed design of the enlarger itself is not important and enlargers of other types, for example, enlargers without condenser lenses can be used if so desired. The particular enlarger shown in Fig. 1 comprises a base 20, usually made from plywood or the like which carries an upright structure comprising a casting 21 and one or several metal members 22. These members are arranged either in a vertical or, preferably, in a slightly inclined position as shown. Slidably mounted on these members is a projector carriage 23 which consists, for example, of two plates which are held together by four studs 24. These last named studs may also serve for rollers 25 by means of which the carriage can easily be moved in a substantially vertical direction upon members 22. The upper end of the carriage supports a lamphousing which comprises preferably an aluminum casting 26 or the like and contains an incandescent lamp 27. Below the lamphousing there is a cylindrical container 28 which houses two condenser lenses 29' and 29" as well as an adjustable filter which forms the object of this invention. Below the lower condenser lens 29" there is a filmholder 30 placed upon a film stage 31. The filmholder consists in a well known manner of two flat plates between which a photographic negative or film is sandwiched. A lens carrier 32 carrying a lens 33 is adjustably supported by a focusing movement which is only shown schematically and which may be adjusted by means of a small handwheel 34. A focusing movement of this type may, for example, comprise a rack and pinion movement. The lens carrier 32 is connected to the film stage 31 by light-tight but extensible bellows 35. The entire projector carriage including the lamphousing, lens and focusing movement is preferably counterbalanced by springs 36 which may be of the type commercially available as sash weight balances.

Filter cells

The filter cells containing the colored liquid may be interposed in the light beam of the enlarger in any convenient place, for example, immediately in front of the lamp or above or below the enlarging lens. Obviously, any place between the source of light and the negative is to be preferred since in this manner the resolving power of the lens, i. e., the sharpness of the enlarged image projected by the lens 33 upon the base 20 is not impaired by imperfections in the filters themselves. In a condenser enlarger, such as shown, the preferred place for the insertion of the filters is between the condenser lenses 29' and 29" and it is preferable in this case so as to dimension the enlarger in such a way that the distance between the lamp 27 and the upper condenser lens 29' is at least substantially identical to the corresponding distance between the principal points of the lens 33 and the lower condenser lens 29" because then the light rays between the two condenser lenses will be parallel.

The filter comprises at least one cell with side walls which, of course, should be impervious to light, and transparent top and bottom walls. These transparent walls may be made either from glass or from a suitable transparent plastic and are generally positioned in horizontal planes. In the example shown in Fig. 1, three cells are provided which are formed by the housing 28 and the transparent walls 40, 41, 42 and 43. These four walls, of course, form a triple cell with three cavities which may be occupied by layers of different thickness of liquids of three different colors, respectively.

While I have shown in the drawing in Fig. 1 a triple cell, it will of course be understood that any number of cells including a single cell may be used if so desired and that these cells may be substantially of the same construction as the triple cell shown.

For example, a single cell may be used when it is contemplated to make three color separation negatives from color transparencies in which case successively a red, blue and green liquid may be used. It is also possible to use a single cell for the control of contrast of commercially available variable contrast paper. Papers of this type usually yield a relatively high contrast when exposed to blue and a relatively low contrast when exposed to yellow or green light, with intermediate contrast grades available by exposure to light of intermediate color shades. In this case, the cell can be filled with two liquids of different specific gravity which are unmixable with each other, one liquid having a yellow and the other having a blue color. One of these liquids may, for example, be a watery solution of either an organic dye or a mineral salt, whereas the other may be formed by a suitable oil base to which an appropriate color has been added. Depending upon the relative thickness of the two superimposed layers of the colored liquids, the shade of the light penetrating the filter will vary and the contrast of the finished print may be controlled thereby.

A triple cell as shown in Fig. 1 serves the purpose of introducing a color correction into the light beam of the enlarger, which is generally necessary whenever it is desired to make color prints from color transparencies upon color print material of the so-called monopack type, i. e., upon material which comprises three sensitive layers superimposed upon each other, which after processing contain images dyed in three different colors. This color correction can be performed best if the three cells contain, respectively, colored liquids which are complementary to the three primary colors. These complementary colors are cyan, magenta and yellow. Cyan, which is sometimes called "minus red" absorbs red but passes blue and green light. Magenta "minus green" absorbs green but passes red and blue. Yellow "minus blue" absorbs blue but passes red and green. Depending upon the relative height of the three respective layers within the cavities of the triple cell the color of the light of the enlarger may be shifted towards any desired predominant color, and by suitable means the magnitude of said shift may be controlled.

While theoretically it would be perfectly sufficient to have each cell partly filled, respectively, with the cyan, magenta and yellow liquid, leaving the rest of it empty, it is preferable for mechanical reasons to use two liquids which are of different specific gravity and unmixable with each other, one of said liquids being of minus red, minus green or minus blue color, respectively, and the other being colorless. The colored liquids may be formed for example, by aqueous solutions of either organic dyes or mineral salts, and the colorless liquid may be a so-called "water-white" mineral oil. By means of this arrangement much better mechanical stability is obtained and small vibrations have much less effect upon the level of the various colored liquids and upon their filter action.

*Control mechanism*

It will be obvious that an adjusting mechanism which comprises three independent devices for the three cells, respectively, will be very inconvenient and cumbersome since it would be extremely difficult for the operator to select from the infinite number of possible combinations the one which results in the desired color correction, both with respect to color as well as magnitude. I have, therefore, provided the mechanism described in the following paragraphs by means of which the operator can easily select independently the direction as well as the magnitude of a desired color correction.

A control device for the thickness of a colored liquid contained in a cell of the type described must, of course, comprise a device with an adjustable volume which, by means of a flexible hose or the like, is in intercommunication with the cell. The most commonly used device with an adjustable volume is a piston and a cylinder and while such an arrangement is entirely feasible, it suffers from a certain disadvantage because leakage between the two compartments of the cylinder on either side of the piston cannot always be completed avoided. For that reason, I prefer to use flexible bellows, usually fabricated from spring hard sheet bronze or the like which are commercially available and which eliminate any possible leakage. Arrangements of this type have been shown in Figs. 1 and 2.

For the preferred arrangement which contemplates the use of three cells, each with two types of liquids, three sets of twin bellows are used, see Fig. 2. The three upper compartments are connected to the three upper portions of the three cells and are filled, for example, with a colorless mineral oil, whereas the three lower compartments are connected to the lower portions of the three cells and are filled, respectively, with aqueous solutions of cyan, magenta and yellow color.

A control mechanism is provided which permits the adjustment of the relative volumes of all six compartments simultaneously, but in such a manner that direction and magnitude of a desired color correction can be controlled independently by the operator.

*Mathematical basis of control mechanism*

A color correction can mathematically be treated as a vector since it has direction as well as magnitude. The direction denotes the predominant color towards which the color of the light beam of the enlarger is to be shifted. If this direction for one of the primary colors is expressed by the angle $\varphi$, the two angles for the two other primary colors are expressed by $\varphi+120°$ and $\varphi+240°$, i. e., the three primary colors are assumed to have a phase shift relative to each other of 120°. The magnitude of a desired color correction will be expressed by the factor $m$.

The corresponding color corrections for the three primary colors can then be obtained by multiplying "normal" red, green and blue light intensities $L_{R_0}$, $L_{G_0}$ and $L_{B_0}$ with $mf(\varphi)$, $mf(\varphi+120°)$ and $mf(\varphi+240°)$, respectively. This means that the red, green and blue intensities, after the color correction has been applied, can be expressed as follows:

$$L_R = L_{R_0}(1+mf(\varphi))$$
$$L_G = L_{G_0}(1+mf(\varphi+120°))$$
$$L_B = L_{B_0}(1+mf(\varphi+240°))$$

It is obvious that the operation of the enlarger would be greatly facilitated if the three functions of $\varphi$ would so be chosen that the total light output of the enlarger is independent of the color correction, i. e., $$L_R + L_G + L_B = \text{Const.}$$

It is assumed that the unfiltered light of the enlarger is white and that consequently it contains red, blue and green light of equal intensitives. Light intensities in this relation must, of course, be expressed in terms of actinic power, i. e., we shall assume that two light intensities of different colors have the same intensity if they produce the same print density. Under these conditions, i. e., with white light, the function of $\varphi$ should be such that $$f(\varphi) + f(\varphi+120°) + f(\varphi+240°) = 0$$

There are a number of such functions conceivable and two preferred ones are shown in the representations of Figs. 3 and 4.

The function represented in Fig. 3 is the well known sine function where $$\sin \varphi + \sin (120°+\varphi) + \sin (240°+\varphi) = 0$$

The conditions obtainable under these circumstances have a great similarity with those of an electrical system using the well known three phase current. Another function which also fulfills the condition formulated above is shown in Fig. 4. There the light intensity of one color remains constant for 120°, increases in a straight line to a maximum value for the next 60°, decreases in a straight line for 120° to a minimum and increases for the next 60° again until it becomes zero again. The three color corrections are again phase shifted relative to each other by 120°.

The filter action of a layer of colored liquid follows the well known logarithmic law, i. e., we can express the transmitted light of the various colors in terms of the maximum light intensity of the same color and the absorption factor and thickness of the colored liquid in the following manner:

$$L_R = L_{R_{max}} \cdot e^{-K_c d_c}$$
$$L_G = L_{G_{max}} \cdot e^{-K_m d_m}$$
$$L_B = L_{B_{max}} \cdot e^{-K_y d_y}$$

$L_R$, $L_G$ and $L_B$ are the transmitted red, green and blue light intensities. $L_{R_{max}}$, $L_{G_{max}}$ and $L_{B_{max}}$ are the unfiltered light intensities of the same color, i. e. the minimum light intensities emanating from the source of light. $K_c$, $K_m$ and $K_y$ are the absorption factors of the cyan, magenta and yellow liquid, and $d_c$, $d_m$ and $d_y$ are the corresponding thicknesses. $e$ is the base of the "natural" system of logarithms.

It will be obvious that the unfiltered or maximum light intensities used in the above three formulae cannot be the same as the "normal" light intensities of the same colors used in the previous formulae, because a glance at Fig. 3 or 4 will show immediately that $L_R$, $L_G$ and $L_B$ at times become larger than $L_{R_0}$, $L_{G_0}$ and $L_{B_0}$. A filter, of course, can only decrease but never increase the intensity of any light. It is, therefore, necessary to start with maximum intensities $L_{R_{max}}$, $L_{G_{max}}$ and $L_{B_{max}}$ which are larger than the "normal" intensities $L_{R_0}$, $L_{G_0}$ and $L_{B_0}$. The discrepancy can conveniently be expressed in terms of the maximum color correction factor $m_{max}$ for which the device is designed. How large $m_{max}$ is, is to a large extent a question of good judgment. Experience has shown, however, that even with correction filters, acceptable color prints can usually be obtained only from transparencies that are at least approximately well balanced, and if we assume that $m_{max}$ can be limited to a value of .25 we shall probably be not too far from satisfactory conditions.

With the above assumptions we have $$L_{R_{max}} = L_{R_0}(1+m_{max})$$
$$L_{G_{max}} = L_{G_0}(1+m_{max})$$
$$L_{B_{max}} = L_{B_0}(1+m_{max})$$

By combining the two values obtained for $L_R$, $L_G$ and $L_B$, we can now write $$e^{-K_c d_c} = \frac{1+mf(\varphi)}{1+m_{max}}$$

$$e^{-K_m d_m} = \frac{1+mf(\varphi+120°)}{1+m_{max}}$$

$$e^{-K_y d_y} = \frac{1+mf(\varphi+240°)}{1+m_{max}}$$

These three formulae can be resolved for the corresponding filter thicknesses:

$$d_c = \frac{1}{K_c} L_n(1+m_{max}) - \frac{1}{K_c} L_n(1+mf(\varphi))$$

$$d_m = \frac{1}{K_m} L_n(1+m_{max}) - \frac{1}{K_m} L_n(1+mf(\varphi+120°))$$

$$d_y = \frac{1}{K_y} L_n(1+m_{max}) - \frac{1}{K_y} L_n(1+mf(\varphi+240°))$$

In order to adjust the filter thicknesses according to these formulae, a mechanism is used which comprises three cams. These cams are, of course, of identical configuration and are mounted on a common shaft angularly offset relative to each other by 120°. For the design of these cams, we are interested only in the increase or decrease of the radius, i. e., in the radial increment which, of course, is proportional to the respective increment of the filter thicknesses. In other words, the first term in the above formulae which is not a function of either $m$ or $\varphi$ can be omitted and, for convenience, all constant factors of the second term can be lumped together into a new constant called $b$. This constant may also contain the modulus of the natural system of logarithms so that the common Briggs logarithms can be used instead of the natural logarithms, which is more convenient. The minus sign preceding the second term in the formulae above may also be omitted since, with regard to the radial increment, it is of no significance because depending upon the design of the cam, this increment may be either added or subtracted from a conveniently assumed constant radius. Therefore, the design of the cam can be simply based upon the following formula:

$$\Delta_R = b \log(1 + mf(\varphi))$$

In the case of the sine function, this formula becomes $$\Delta_R = b \log(1 + m \sin \varphi)$$

A cam constructed accordingly is shown in Fig. 6, and three cams mounted on a common shaft relatively offset with respect to each other are shown in Fig. 7.

*Mechanical design of control mechanism*

Based on one of the last named two formulae, a number of possible solutions will immediately occur to anyone skilled in the art. For example, a three dimension cam representing $\Delta R$ as a function of the two variables $m$ and $\varphi$ may be used such as shown, for example, in Fig. 33 of the paper "Designing Computing Mechanisms" by Macon Fry, published in the periodical "Machine Design" August 1945 through February 1946. It is also possible to design a mechanical or electrical computing device which computes $\log(1 + m \sin \varphi)$ from $m$ and $\varphi$. A device which computes $(1 + m \sin \varphi)$ has, for example, been shown in my co-pending application No. 34,387, now Patent No. 2,518,947, and by simply adding a cam controlled converting device or a suitable linkage system, the corresponding logarithmic value can be obtained therefrom.

Solutions of this type are entirely feasible but are, in the case of the three dimensional cam, afflicted with certain manufacturing difficulties and in the case of the mechanical computing device, they tend to become unduly complicated. I prefer, therefore, an approximate solution which is considerably simpler and which serves its purpose with an approximation which is perfectly sufficient.

This solution is based on the graphical representation in Fig. 5 where a family of curves is shown which represent $\log(1 + m \sin \varphi)$ for various $m$ values from 0 to .25 in steps of .05. It can be seen that these curves are with a very good degree of approximation uniformly spaced relative to each other and it is, therefore, approximately true that $$\log(1 + m \sin \varphi) = \text{approx.} \frac{m}{m_0} \log(1 + m_0 \sin \varphi)$$

In other words, a curve for a certain $m$ value can be derived from a similar curve for an $m_0$ value by merely multiplying all ordinates by $$\frac{m}{m_0}$$

$m_0$ may assume any value which is larger than zero and smaller than $m_{max}$ which is the maximum value for $m$ for which the device is designed.

A device built accordingly is shown diagrammatically to some extent in the sectional view at the right side of Fig. 1.

The various component parts of the device are mounted in a housing which comprises a base 120 and a cover 121 which, for example, may be made from sheet metal. Attached to the base 120 within this housing is a bracket 105 which is preferably formed by an aluminum casting or the like and which supports most of the other parts which will be described in the next paragraph.

Each of the three bellows assemblies comprises an upper bellows 60, a lower bellows 61, separated by a dividing wall 62. The upper bellows is closed by an upper wall 63 with an outlet 64 and the lower bellows is closed by a lower wall 65 with an outlet 66. The corresponding parts can also be seen in Fig. 2. It is shown there that the outlet 64 leads to the upper portion and the outlet 66 to the lower portion of one of the cells which are placed into the light beam of the enlarger. The two other twin bellows assemblies are connected correspondingly to the two other cells.

Referring again to Fig. 1, it can be seen that the upper wall 63 and the lower wall 65 are stationary, whereas the dividing wall 62 is movable. This is done by means of a mechanism which comprises two guide rods 70 which are fixedly attached to 62 and which terminate in a transverse piece 71. Spring 72 biases the dividing wall in such a way that it has the tendency to move downwards. Shaft 80 carries the cams 81 which are identical with the cams shown, respectively, in Fig. 6 and Fig. 7. Between these cams and the bellows assembly or, more particularly, the transverse piece 71 is a lever arrangement with an adjustable ratio by means of which the "$m$" value, i. e., the magnitude of a desired color correction, can be adjusted. This lever assembly comprises a first lever 82, which is rotatably supported by a pivot 83 attached to a bearing block 84. A second lever 92 is provided which on its right side is supported by a pivot 93 and which carries on its left side a roller 94 in operative contact with the aforementioned transverse member 71 which, in turn, actuates the dividing wall 62 between the two bellows 60 and 64.

Between the two levers 82 and 92 there is a connecting piece 100 carrying rollers 101 on its upper and 102 at its lower end. These rollers are, respectively, in contact with levers 92 and 82. The connecting piece 100 is capable of performing a vertical as well as a horizontal motion and is for that purpose guided in a horizontal direction by a part 103 within which it is free to move vertically. Part 103 is, in turn, slidably supported by the main supporting bracket 105. It is biased by a spring 106 which tends to shift it towards the right and carries at its right end a cam following roller 107. This cam following roller, in turn, contacts a spiral shaped cam 108 mounted on a shaft 109.

Cam 108 is again shown in Fig. 8, and shaft 109 which carries three of these cams is illustrated in Fig. 9. It can be seen that these cams are in phase with each other, as distinguished from the three cams shown in Fig. 7 which are out of phase with respect to each other. A rotation of shaft 109 with its three cams 108, therefore, affects all members 103 of all three bellows assemblies in precisely the same manner, i. e., shifts them more or less towards the left. The parts 100, respectively connected to parts 103, will, therefore, be also shifted horizontally. Due to their freedom to slide vertically relative to their supporting pieces 103, they will then always form an operative contact between levers 82 and 92 of the three lever assemblies for the three respective bellows assemblies. Consequently, the device works in such a way that a rotation of shaft 80 with the three angularly offset cams 81 affects the three dividing walls 62 in the manner shown in Fig. 2, i. e., these dividing walls will assume different levels which are reflected in corresponding levels within the three cells of the filter system proper. The height of the layers of the colored liquid in the three filter cells will, therefore, follow the law according to which the three cams 81 have been designed and the light output of the enlarger will then follow, for example, the law shown in the graph of Fig. 3 or Fig. 4. The result is that the operator can adjust the direction of a color correction by simply turning shaft 80 and that he can adjust the magnitude of said color correction by turning shaft 109. For convenience, the two shafts are connected to small handwheels equipped with pointers and these pointers will preferably cooperate with appropriate dials fastened to the front face of the housing containing the bellows assembly. The dial for shaft 80 will, of course, contain three divisions offset relative to each other by 120° and marked red, blue and green, respectively. Intermediate colors will be correspondingly spaced between these three main divisions. The dial for shaft 109 will simply contain "$m$" values, and it will, of course, be preferable to give the cam 108 such a configuration that the $m$ values will be uniformly spaced. For this purpose the peculiar conditions given by the two levers 82 and 92 must be taken into consideration, i. e., the cam in a system of polar coordinates should follow the formula $$m = n\alpha = \frac{a}{L-a}$$

where $a$ is the angle in a system of polar coordinates,
$n$ is a proportionality factor,
$a$ is the distance between pivot 83 and the point of contact between roller 102 and lever 82, and
$L$ is the length of levers 82 and 92, respectively,
$a$ in turn, is of course identical with the radial increment $\Delta_R$ of cam 108.

While I have shown a preferred embodiment of the invention in the drawings and described the same herein, it is obvious that many modifications may be made in the instrumentalities disclosed without departing from the principles of the invention as defined in the appended claims.

What I claim as new, is:

1. A control device for a liquid filled multiple color filter for use in photographic enlargers, said filter comprising a plurality of cells, each adapted to contain a layer of variable thickness of a liquid of a different color, means supporting said cells vertically above each other, in the light beam of the enlarger, each cell having transparent top and bottom walls arranged in horizontal planes and vertically disposed side walls, said control device comprising a plurality of variable volume reservoirs, equal in number to the number of said cells, a conduit connecting each cell with a reservoir, each interconnected cell and reservoir having therein a colored liquid of a different color from each other interconnected cell and reservoir, each of said reservoirs comprising two parts displaceable relative to each other to force liquid from said reservoir to the cell to which it is connected by one of said conduits or to withdraw liquid from said cell to control the thickness of the layer of liquid in said cell, and two mechanisms controlling the position of said displaceable parts relative to each other, and operatively connected to them, the first mechanism comprising members operatively connected to each other for simultaneous operation and equal in number to the number of said cells and each, adapted to adjust the relative displacement of said two parts of its reservoir, said members having a phase shift relative to each other, the second mechanism comprising means operatively connected to said displaceable parts to vary the relative displacement thereof in the same direction for changing of displacements, as adjusted by the first mechanism, simultaneously whereby said second mechanism either increases or decreases the thicknesses of the layers of liquid in all cells simultaneously.

2. A device according to claim 1, each of said variable volume reservoirs including a support, an element stationary relative to said support, and an element movable relative to said stationary element and said support, said two elements together forming a cavity adapted to contain a volume of liquid, said first mechanism comprising a first set of simultaneously operated driving movements and a first set of elements driven thereby, said first set of driven elements comprising a plurality of pivoted levers, equal in number to the number of said cells, said first set of driving movements comprising means to adjust the angle of said pivoted levers by rotating them on their pivot points, whereby said levers may assume all possible positions between two extremes, said second mechanism comprising a second set of simultaneously operated driving movements and a second set of elements driven thereby, said second set of driven elements comprising a plurality of pivoted levers, equal in number to the number of said cells, and extending from their pivot points in a direction parallel, but opposite, to the direction in which said first set of pivoted levers extends from their respective pivot points, each lever in operative contact with one of the movable elements forming parts of said variable volume reservoirs, said second mechanism comprising a plurality of shiftable members, equal in number to the number of said cells, and positioned between said two sets of pivoted levers, each of said shiftable members in operative contact with one of the pivoted levers that form the first set of driven elements, and with one of the pivoted levers that form the second set of driven elements, and adapted to transmit motion from the former to the latter, said shiftable members having an operative connection to the driving movement of said second mechanism for shifting them along said pivoted levers.

3. A device according to claim 1, adapted to be used as a filter when making photographic color prints, the number of said cells being three, and said cells being filled with liquids of colors, respectively, complementary to the three primary colors, each of said variable volume reservoirs including a support, an element stationary relative to said support, and an element movable relative to said stationary element and said support, said two elements together forming a cavity adapted to contain a volume of liquid, said first mechanism comprising a first set of simultaneously operated driving movements and a first set of elements driven thereby, said first set of driven elements comprising a plurality of pivoted levers, equal in number to the number of said cells, said first set of driving movements comprising means to adjust the angle of said pivoted levers by rotating them on their pivot points, whereby said levers may assume all possible positions between two extremes, said second mechanism comprising a second set of simultaneously operated driving movements and a second set of elements driven thereby, said second set of driven elements comprising a plurality of pivoted levers, equal in number to the number of said cells, and extending from their pivot points in a direction parallel, but opposite, to the direction in which said first set of pivoted levers extends from their respective pivot points, each lever in operative contact with one of the movable elements forming parts of said variable volume reservoirs, said second mechanism comprising a plurality of shiftable members, equal in number to the number of said cells, and positioned between said two sets of pivoted levers, each of said shiftable members in operative contact with one of the pivoted levers that form the first set of driven elements and with one of the pivoted levers that form the second set of driven elements and adapted to transmit motion from the former to the latter, said shiftable members having an operative connection to the driving movement of said second mechanism for shifting them along said pivoted levers, the driving movements of said first mechanism comprising three cans fastened to a common shaft and each in operative contact with one of the levers of said first mechanism, said cams angularly offset with respect to each other by an angle of 120°, the driving movements of the second mechanism comprising three other cams fastened to another common shaft and each in operative contact with and disposed to shift one of said shiftable members of said second mechanism along said pivoted levers, said last-named cams being angularly in line with each other, whereby rotation of the shaft that carries the cams which are offset relative to each other, causes an adjustment of the ratios between the thicknesses of the layers of liquid in the cells and therefore of the predominant color of a desired color correction without affecting the magnitude of said correction, and whereby rotation of the shaft that carries the cams which are in line with each other causes the adjustment simultaneously of the thickness of all of the layers of liquid in all of the cells and therefore of the magnitude of said color correction without affecting its predominant color.

4. A device according to claim 1, adapted to be used as a filter when making photographic color prints, the number of said cells being three, and said cells being filled with liquids of colors, respectively, complementary to the three primary colors, each of said variable volume reservoirs including a support, an element stationary relative to said support, and an element movable relative to said stationary element and said support, said two elements together forming a cavity adapted to contain a volume of liquid, said first mechanism comprising a first set of simultaneously operated driving movements and a first set of elements driven thereby, said first set of driven elements comprising a plurality of pivoted levers, equal in number to the number of said cells, said first set of driving movements comprising means to adjust the angle of said pivoted levers by rotating them on their pivot points, whereby said levers may assume all possible positions between two extremes, including a first set of three cams mounted on a common shaft, and each in operative contact with one of the levers of said first mechanism, said cams having a configuration expressed by the formula $$\Delta_R = b \cdot \frac{m}{m_0} \log(1 + m_0 f(\varphi))$$

where $\Delta_R$ is the increment of the cam radius in a system of polar coordinates, $\varphi$ is the corresponding angle, denoting the direction of a desired color correction, $b$ is an arbitrary constant, reducing the cam size to practical dimensions, $m$ is a factor smaller than unity and denoting the magnitude of the desired color correction, proportional to the aforementioned lever ratio, $m_0$ is an arbitrary factor which must be larger than zero and smaller than the largest intended color correction factor $m_{max}$, and $f(\varphi)$ is a function of $\varphi$ so chosen that the total light of the three primary colors transmitted by the filters remains constant, i. e., $$f(\varphi) + f(\varphi + 120°) + f(\varphi + 240°) = \text{const.}$$

said second mechanism comprising a second set of simultaneously operated driving movements and a second set of elements driven thereby, said second set of driven elements comprising a plurality of pivoted levers, equal in number to the number of said cells, and extending from their pivot points in a direction parallel, but opposite, to the direction in which said first set of pivoted levers extends from their respective pivot points, each lever in operative contact with one of the movable elements forming parts of said variable volume reservoirs, said second mechanism comprising a plurality of shiftable members, equal in number to the number of said cells, and positioned between said two sets of pivoted levers, each of said shiftable members in operative contact with one of the pivoted levers that form the first set of driven elements and with one of the pivoted levers that form the second set of driven elements and adapted to transmit motion from the former to the latter, said shiftable members having an operative connection to the driving movement of said second mechanism for shifting them along said pivoted levers, said second mechanism including a second set of three cams mounted on a common shaft and each in operative contact with and disposed to shift one of said shiftable members on said second mechanism along said pivoted levers, the three cams of said first mechanism being angularly offset with respect to each other, and the three cams of the second mechanism being angularly in line with each other, whereby rotation of the shaft that carries the cams which are offset relative to each other causes an adjustment of the ratios between the thicknesses of the layers of liquid in the cells and therefore of the predominant color of a desired color correction without affecting the magnitude of said correction, and whereby rotation of the shaft that carries the cams which are in line with each other causes the adjustment simultaneously of the thicknesses of all of the layers of liquid in all of the cells and therefore of the magnitude of said color correction without affecting its predominant color.

5. A device according to claim 1, adapted to be used as a filter when making photographic color prints, the number of said cells being three, and said cells being filled with liquids of colors, respectively, complementary to the three primary colors, each of said variable volume reservoirs including a support, an element stationary relative to said support, and an element movable relative to said stationary element and said support, said two elements together forming a cavity adapted to contain a volume of liquid, said first mechanism comprising a first set of simultaneously operated driving movements and a first set of elements driven thereby, said first set of driven elements comprising a plurality of pivoted levers, equal in number to the number of said cells, said first set of driving movements comprising means to adjust the angle of said pivoted levers by rotating them on their pivot points, whereby said levers may assume all possible positions between two extremes, including a first set of three cams mounted on a common shaft and each in operative contact with one of the levers of said first mechanism, said cams having a configuration expressed by the formula $$\Delta_R = b \cdot \frac{m}{m_0} \log(1 + m_0 \sin \varphi)$$

where $\Delta_R$ is the increment of the cam radius in a system of polar coordinates,
$\varphi$ is the corresponding angle, denoting the direction of a desired color correction,
$b$ is an arbitrary constant, reducing the cam size to practical dimensions,
$m$ is a factor smaller than one and denoting the magnitude of the desired color correction, proportional to the aforementioned lever ratio, and
$m_0$ is an arbitrary factor which must be larger than zero and smaller than the largest intended color correction factor $m_{max}$, said second mechanism comprising a second set of simultaneously operated driving movements and a second set of elements driven thereby, said second set of driven elements comprising a plurality of pivoted levers, equal in number to the number of said cells, and extending from their pivot points in a direction parallel, but opposite, to the direction in which said first set of pivoted levers extends from their respective pivot points, each lever in operative contact with one of the movable elements forming parts of said variable volume reservoirs, said second mechanism comprising a plurality of shiftable members, equal in number to the number of said cells, and positioned between said two sets of pivoted levers, each of said shiftable members in operative contact with one of the pivoted levers that form the first set of driven elements and with one of the pivoted levers that form the second set of driven elements and adapted to transmit motion from the former to the latter, said shiftable members having an operative connection to the driving movement of said second mechanism for shifting them along said pivoted levers, said second mechanism including a second set of three cams mounted on a common shaft and each in operative contact with and disposed to shift one of said shiftable members of said second mechanism along said levers, the three cams of the first mechanism being angularly offset with respect to each other, and the three cams of the second mechanism being angularly in line with each other, whereby rotation of the shaft that carries the cams which are offset relative to each other causes an adjustment of the ratios between the thicknesses of the layers of liquid in the cells and therefore of the predominant color of a desired color correction without affecting the magnitude of said correction, and whereby rotation of the shaft that carries the cams which are in line with each other causes the adjustment simultaneously of the thicknesses of all of the layers of liquid in all of the cells and therefore of the magnitude of said color correction without affecting its predominant color.

ALFRED SIMMON.

REFERENCES CITED

The following references are of record in the file of this patent:

UNITED STATES PATENTS

| Number | Name | Date |
|---|---|---|
| 786,613 | Villani | Apr. 4, 1905 |
| 1,646,500 | Sieber | Oct. 25, 1927 |
| 1,739,478 | Bielecki | Dec. 10, 1929 |
| 1,782,328 | Wearham | Nov. 18, 1930 |
| 1,887,285 | Burrell et al. | Nov. 8, 1932 |
| 1,902,387 | Von Hofe et al. | Mar. 21, 1933 |
| 2,085,190 | Gretener et al. | June 29, 1937 |
| 2,300,251 | Flint | Oct. 27, 1942 |
| 2,470,584 | Simmon | May 17, 1949 |